(12) United States Patent
Yamashita et al.

(10) Patent No.: US 11,075,562 B2
(45) Date of Patent: Jul. 27, 2021

(54) BUS BAR UNIT AND MOTOR

(71) Applicant: Nidec Corporation, Kyoto (JP)

(72) Inventors: Yoshiaki Yamashita, Kyoto (JP);
Shunsuke Takahashi, Kyoto (JP);
Takao Atarashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 155 days.

(21) Appl. No.: 16/487,510

(22) PCT Filed: Mar. 13, 2018

(86) PCT No.: PCT/JP2018/009640
§ 371 (c)(1),
(2) Date: Aug. 21, 2019

(87) PCT Pub. No.: WO2018/180447
PCT Pub. Date: Oct. 4, 2018

(65) Prior Publication Data
US 2020/0059127 A1 Feb. 20, 2020

Related U.S. Application Data

(60) Provisional application No. 62/479,490, filed on Mar. 31, 2017.

(30) Foreign Application Priority Data

Sep. 29, 2017 (JP) .............................. JP2017-191371

(51) Int. Cl.
*H02K 3/52* (2006.01)
*B62D 5/14* (2006.01)

(52) U.S. Cl.
CPC ............... *H02K 3/522* (2013.01); *B62D 5/14* (2013.01); *H02K 2203/09* (2013.01)

(58) Field of Classification Search
CPC .......................... H02K 3/522; H02K 2203/09
See application file for complete search history.

(56) References Cited

U.S. PATENT DOCUMENTS 7,579,732 B2 * 8/2009 Yamaguchi .............. H02K 3/50
310/43
8,922,079 B2 12/2014 Egami et al.
(Continued)

FOREIGN PATENT DOCUMENTS

DE 10 2015 001 096 A1 9/2016
JP 2003-134758 A 5/2003
(Continued)

OTHER PUBLICATIONS

Official Communication issued in International Patent Application No. PCT/JP2018/009640, dated Jun. 19, 2018.
(Continued)

*Primary Examiner* — Robert W Horn
(74) *Attorney, Agent, or Firm* — Keating & Bennett

(57) ABSTRACT

A bus bar unit includes a bus bar holder, a bus bar extending in a direction perpendicular to an axial direction and fixed to the bus bar holder, and an external connection terminal connected to the bus bar and extending to one side in the axial direction from the bus bar. The external connection terminal has a plate shape. The external connection terminal includes a first plate portion extending toward one side in the axial direction and a second plate portion that is positioned on a base end side of the first plate portion, is provided with a connection portion connected to the bus bar, and faces a direction different from the first plate portion. The first plate portion and the second plate portion are connected to each other in a bending line extending in the axial direction, and
(Continued)

the second plate portion extends from one surface side to the other surface side of the first plate portion when viewed in the axial direction.

8 Claims, 13 Drawing Sheets

(56) References Cited

U.S. PATENT DOCUMENTS

| | | | |
|---|---|---|---|
| 10,666,110 B2 * | 5/2020 | Ito | H01R 9/223 |
| 10,742,003 B2 * | 8/2020 | Takahashi | H02K 21/14 |
| 10,903,711 B2 * | 1/2021 | Ogawa | H02K 3/522 |
| 2011/0001388 A1 | 1/2011 | Fujii et al. | |
| 2011/0006625 A1 | 1/2011 | Fujii et al. | |
| 2012/0223604 A1 * | 9/2012 | Hennecke | H02K 11/33 310/71 |
| 2013/0328425 A1 | 12/2013 | Tomita et al. | |
| 2014/0183993 A1 * | 7/2014 | Takasaki | H02K 15/0062 310/71 |
| 2015/0357878 A1 | 12/2015 | Fukunaga et al. | |
| 2016/0190887 A1 | 6/2016 | Sambuichi et al. | |
| 2016/0294240 A1 | 10/2016 | Kawamoto et al. | |
| 2018/0309340 A1 * | 10/2018 | Ogawa | H02K 11/0094 |
| 2019/0157934 A1 * | 5/2019 | Kawaguchi | H02K 3/38 |
| 2019/0348884 A1 * | 11/2019 | Popa | H02K 3/521 |
| 2020/0036254 A1 * | 1/2020 | Finger-Albert | H02K 3/50 |
| 2020/0059124 A1 * | 2/2020 | Yamashita | H02K 3/522 |
| 2020/0059126 A1 * | 2/2020 | Takahashi | H02K 3/522 |
| 2020/0059127 A1 * | 2/2020 | Yamashita | H02K 3/522 |
| 2020/0099268 A1 * | 3/2020 | Wiethoff | H02K 3/50 |
| 2020/0227969 A1 * | 7/2020 | Xu | H01R 4/187 |
| 2020/0343781 A1 * | 10/2020 | An | F16B 43/00 |
| 2021/0050759 A1 * | 2/2021 | Murakami | H02K 15/0068 |

FOREIGN PATENT DOCUMENTS

| | | |
|---|---|---|
| JP | 2007-174869 A | 7/2007 |
| JP | 2008-017583 A | 1/2008 |
| JP | 2008-022620 A | 1/2008 |
| JP | 2010-011627 A | 1/2010 |
| JP | 2011-091885 A | 5/2011 |
| JP | 2013-042633 A | 2/2013 |
| JP | 2015-122880 A | 7/2015 |
| JP | 2015-142429 A | 8/2015 |
| JP | 2016-013053 A | 1/2016 |
| JP | 2016-039682 A | 3/2016 |
| JP | 2016-096708 A | 5/2016 |
| JP | 2016-174527 A | 9/2016 |
| JP | 5989496 B2 | 9/2016 |
| JP | 2017-011830 A | 1/2017 |
| JP | 2017-042004 A | 2/2017 |
| WO | 2015/151214 A1 | 10/2015 |

OTHER PUBLICATIONS

Takahashi, "Bus Bar Unit and Motor", U.S. Appl. No. 16/487,507, filed Aug. 21, 2019.

Yamashita et al., "Bus Bar Unit and Motor", U.S. Appl. No. 16/487,509, filed Aug. 21, 2019.

Takahashi et al., "Motor and Electric Power Steering Apparatus", U.S. Appl. No. 16/487,512, filed Aug. 21, 2019.

Takahashi, "Bus Bar Unit and Motor", U.S. Appl. No. 16/487,513, filed Aug. 21, 2019.

* cited by examiner

BUS BAR UNIT AND MOTOR

CROSS REFERENCE TO RELATED APPLICATIONS

This is a U.S. national stage of PCT Application No. PCT/JP2018/009640, filed on Mar. 13, 2018, and priority under 35 U.S.C. § 119(a) and 35 U.S.C. § 365(b) is claimed from U.S. Provisional Application No. 62/479,490, filed on Mar. 31, 2017, and Japanese Application No. 2017-191371, filed Sep. 29, 2017; the entire contents of each application are hereby incorporated herein by reference.

FIELD OF THE INVENTION

The present disclosure relates to a bus bar unit and a motor.

BACKGROUND

A motor provided with a bus bar unit is known. The bus bar unit includes bus bars to which ends of coils of each phase of a motor are connected. A connector for supplying power from the outside of the motor to the coils of each phase is connected to the bus bar.

For example, a conventional bus bar unit includes C-shaped bus bars (terminals) extending along a circumferential direction of a motor. The bus bar unit includes an external connection terminal inserted into a socket of an external device. The external connection terminal has a flat plate shape, and has an outer shape bent in a crank shape. In the external connection terminal, a base end is joined to a protruding piece protruding outward in a radial direction from the bus bar.

In the above-described bus bar unit, since an external connection terminal is bent in a crank shape, the size is increased, and the yield of a material is reduced.

Further, a base end of the external connection terminal bent in the crank shape further protrudes outward in a radial direction from a protruding piece formed on a bus bar. Thus, when a socket of an external device is inserted into and removed from a front end of an outer side of the external connection terminal in a radial direction, stress due to the moment is concentrated at a base end of an inner side of the external connection terminal in the radial direction. In order to avoid the concentration of the stress, it is required that the external connection terminal be held by a terminal holding portion provided in the bus bar unit. In order to join the external connection terminal to Lie bus bar while holding the external connection terminal by the terminal holding portion, the external connection terminal may have a three-dimensional shape instead of a flat plate shape. However, it takes time and cost to manufacture the external connection terminal of a three-dimensional shape.

SUMMARY

Example embodiments of the present disclosure provide bus bar units each capable of easily manufacturing an external connection terminal of a three-dimensional shape while securing a high yield of the external connection terminal.

One aspect of an example embodiment of the present disclosure provides a bus bar unit that is provided in a motor and includes a bus bar holder provided on one side of an axial direction of a stator disposed in an annular shape around a central axis extending in a vertical direction, a bus bar extending in a direction perpendicular to the axial direction and fixed to the bus bar holder, and an external connection terminal connected to the bus bar and extending to one side in the axial direction from the bus bar. The external connection terminal has a plate shape, and includes a first plate portion extending toward one side in the axial direction, and a second plate portion that is positioned on a base end side of the first plate portion, is provided with a connection portion connected to the bus bar, and faces a direction different from the first plate portion. The first plate portion and the second plate portion are connected to each other in a bending line extending in the axial direction. The second plate portion includes an extension extending from one surface side to the other surface side of the first plate portion when viewed in the axial direction.

The above and other elements, features, steps, characteristics and advantages of the present disclosure will become more apparent from the following detailed description of the example embodiments with reference to the attached drawings.

DETAILED DESCRIPTION

Figure 1:
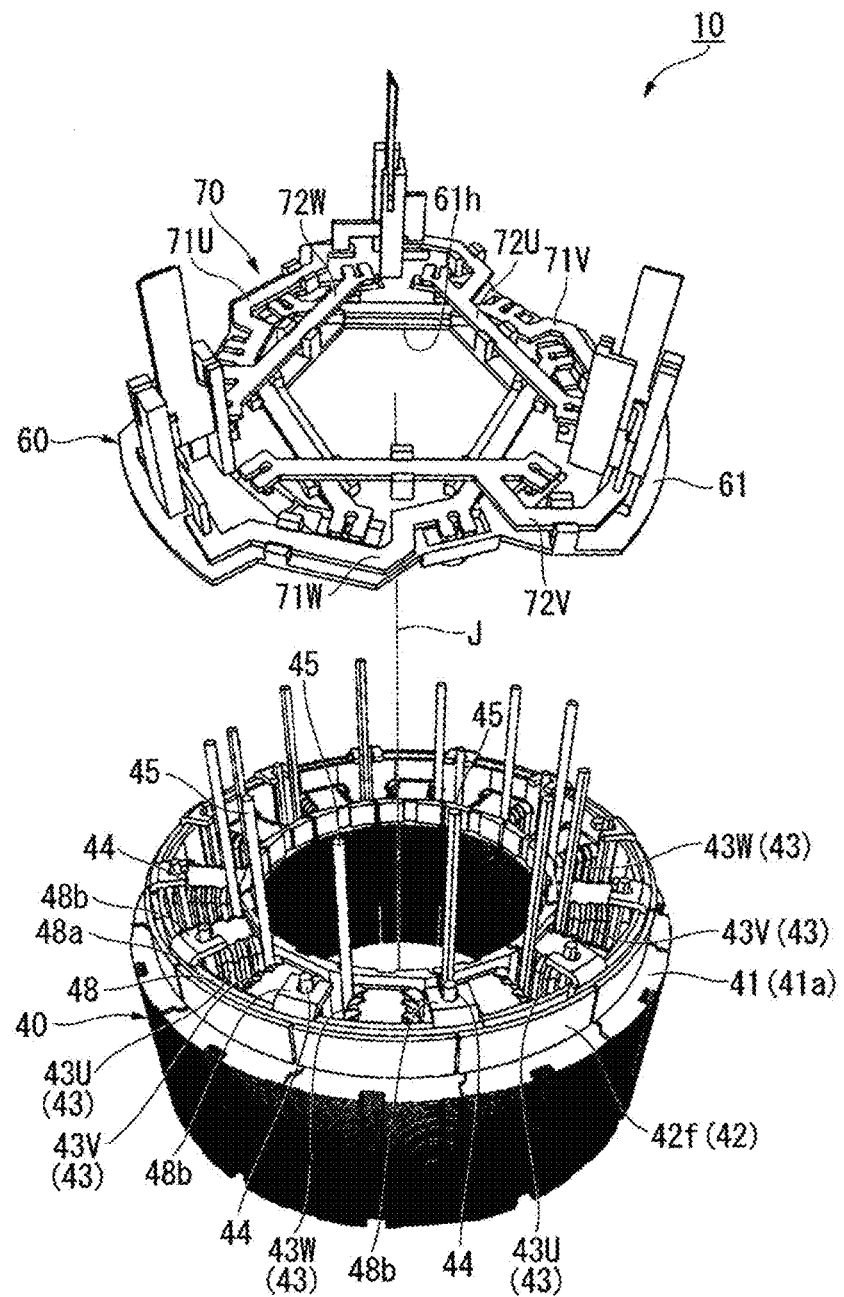
FIG. 1 is a perspective exploded view illustrating a stator and a bus bar unit of a motor according to an example embodiment of the present disclosure.
Figure 2:
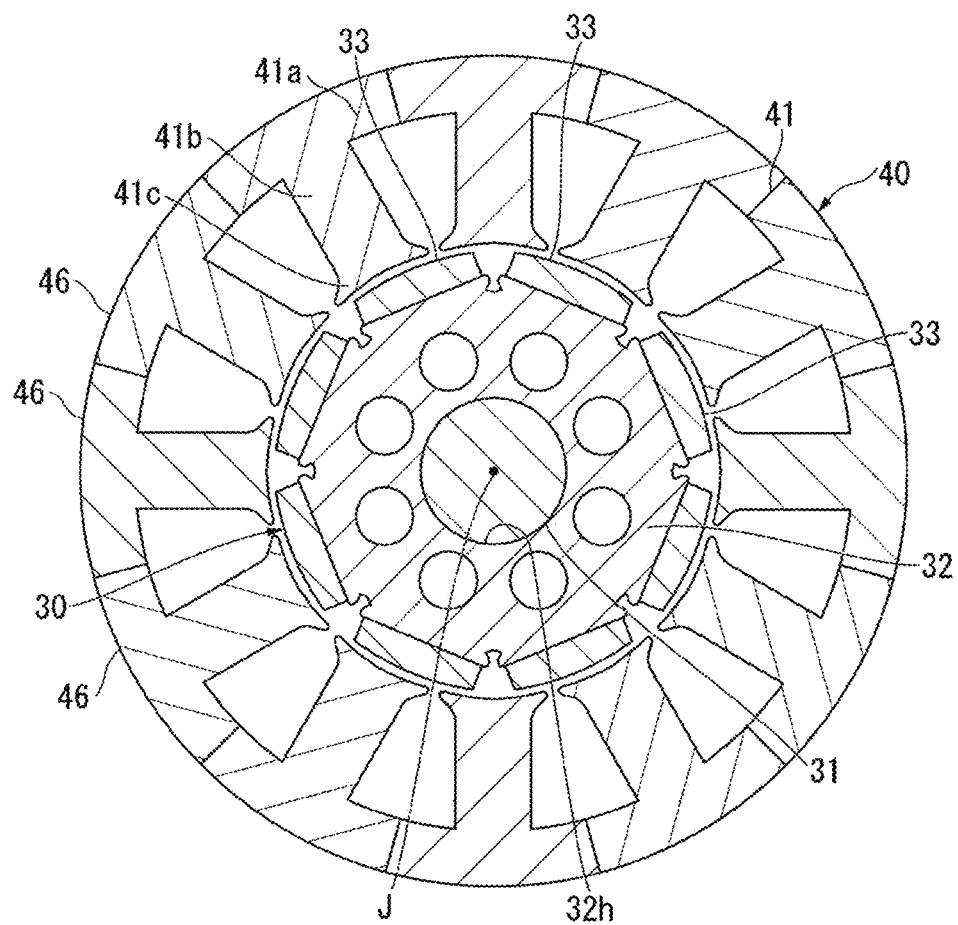
FIG. 2 is a cross-sectional plan view illustrating a configuration of a stator of an example embodiment of the present disclosure.

FIG. 1 is a perspective exploded view illustrating a stator and a bus bar unit of a motor according to the present example embodiment. FIG. 2 is a cross-sectional plan view illustrating a configuration of the stator of the example embodiment. Further, in FIG. 1 and FIG. 2, a specific drawing of coils is omitted.

As shown in FIG. 1, a motor 10 of the present example embodiment includes a rotor 30 (see FIG. 2), a stator 40, a housing (not shown), and a bus bar unit 60.

As shown in FIGS. 1 and 2, the rotor 30 includes a shaft 31 and a rotor core 32. The shaft 31 is disposed along a central axis J extending in a vertical direction.

In the following description, a direction parallel to the central axis J is simply referred to as a "vertical direction", a radial direction centered on the central axis J is simply referred to as a "radial direction", and a circumferential direction centered on the central axis J is simply referred to as a "circumferential direction". Further, an upper side in FIG. 1 in the vertical direction is simply referred to as an "upper side", and a lower side in FIG. 1 in the vertical direction is simply referred to as a "lower side". Further, the upper side, the lower side, and the vertical direction are simply names for describing the relative positional relationship of each part, and the actual arrangement relationship or the like is not limited.

The rotor core 32 is a cylindrical member. When viewed in the vertical direction, an outer shape of the rotor core 32 is a polygonal shape. In the present example embodiment, the outer shape of the rotor core 32 is an octagonal shape. That is, in the present example embodiment, the rotor core 32 is a substantially hollow octagonal column. Further, the rotor core 32 may be a cylinder or the like. The rotor core 32 is a laminated steel plate in which a plurality of electromagnetic steel plates are laminated in the vertical direction.

The rotor core 32 includes a shaft through hole 32h at a center thereof. The shaft 31 passes through the shaft through hole 32h. The shaft 31 may be fixed to the rotor core 32 by press-fitting, adhesion, or the like, or may be fixed through a resin member or the like. That is, the shaft 31 is fixed directly or indirectly to the rotor core 32. The shaft 31 may be a hollow member and is not particularly limited.

In the present example embodiment, the vertical dimension of the rotor core 32 is the same as the vertical dimension of a stator core 41 to be described below. However, the dimension of the rotor core 32 may be different from the dimension of the stator core 41.

A plurality of magnets 33 are each disposed on each outer side surface of the rotor core 32. The magnet 33 is a plate-shaped member extending in the vertical direction. Adjacent magnets 33 face each other in the circumferential direction. The magnet 33 located on one side in the circumferential direction faces the magnet 33 located on the other side in the circumferential direction through a gap in the circumferential direction.

In the present example embodiment, the vertical dimension of the magnet 33 is the same as the length of the vertical dimension of the rotor core 32. An upper surface of the magnet 33 is flush with an upper surface of the rotor core 32. A lower surface of the magnet 33 is flush with a lower surface of the rotor core 32. That is, the vertical dimension of the magnet 33 is the same as the vertical dimension of the stator core 41. In addition, the vertical dimension of the magnet 33 may be different from the vertical dimension of the stator core 41.

The stator 40 is disposed on an outer side of the rotor 30 in the radial direction. As shown in FIGS. 1 and 2, the stator 40 is disposed in an annular shape around the central axis J. The stator 40 is accommodated in the housing (not shown) having a cylindrical shape. The stator 40 includes the stator core 41 having an annular shape, an insulator 42 mounted on the stator core 41, and coils (coil wires) 43 mounted on the stator core 41 through the insulator 42.

The stator core 41 is a laminated steel plate in which a plurality of electromagnetic steel plates are laminated in the vertical direction. The stator core 41 includes a core back portion 41a having an annular shape and a plurality of teeth 41b. In the present example embodiment, the stator core 41 is a so-called split core. A plurality of fan-shaped core pieces 46 are connected to each other in the circumferential direction to form the core back portion 41a. The teeth 41b are formed on an inner circumferential surface of each of the core pieces 46. The teeth 41b extend toward an inner side in the radial direction from the inner circumferential surface of the core piece 46. The teeth 41b are arranged at equal intervals in the circumferential direction on an inner side surface of the core back portion 41a. The teeth 41b faces the magnet 33 of the rotor 30 in the radial direction. The tooth 41b includes an umbrella 41c at an inner end thereof in the radial direction of the tooth 41b. The umbrella 41c extends from the inner end of the tooth 41b in the radial direction to both sides in the circumferential direction. A gap is formed between adjacent umbrellas 41c in the circumferential direction.

Further, the stator core 41 is not limited to the split core and may be other types of cores such as a so-called straight core or round core.

As shown in FIG. 1, the material of the insulator 42 has insulation properties. In the present example embodiment, the material of the insulator 42 is an insulating resin. The insulator 42 covers at least a part of an outer circumferential surface of the tooth 41b.

The insulator 42 includes a flange portion 42f on an upper side of the stator 40. The flange portion 42f is located on an outer side of the insulator 42 in the radial direction. The flange portion 42f has a predetermined height in the vertical direction and extends in the circumferential direction.

Further, the material of the insulator 42 is not limited to the resin, and other materials may be used as long as it has sufficient insulation properties.

The motor 10 of the present example embodiment is a so-called three-phase motor having three phases of a U-phase, a V-phase, and a W-phase. The coils 43 include four U-phase coils 43U, four V-phase coils 43V, and four W-phase coils 43W. In the present example embodiment, a connection method of the coils 43 is a so-called Y-connection method. The U-phase coils 43U, the V-phase coils 43V, and the W-phase coils 43W are arranged adjacent to each other in this order in the circumferential direction. In the present example embodiment, there are four sets of coils 43, and each set of the four sets include the U-phase coil 43U, the V-phase coil 43V, and the W-phase coil 43W.

The coil (coil wire) 43 is wound around the tooth 41b through the insulator 42.

Each coil 43 (the U-phase coil 43U, the V-phase coil 43V, and the W-phase coil 43W) includes a first lead wire 44 and a second lead wire (lead wire) 45. The first lead wire 44 and the second lead wire 45 extend upward in the vertical direction. In each coil 43, the first lead wire 44 is located on an outer side in the radial direction with respect to the second lead wire 45. Further, in each coil 43, the second lead wire 45 extends upward longer than the first lead wire 44 in the vertical direction. In the present example embodiment, one first lead wire 44 and one second lead wire 45 are drawn out from each coil 43. In the present example embodiment, the number of teeth 41b is twelve. Thus, the number of coils 43 is twelve. The number of first lead wires 44 is twelve, and the number of second lead wires 45 is twelve.

The U-phase coil 43U, the V-phase coil 43V, and the W-phase coil 43W of each set are electrically connected to each other by a neutral point bus bar 48. The neutral point bus bar 48 is located on an inner side of the flange portion 42f of the insulator 42 in the radial direction. The neutral point bus bar 48 is made of a metal plate having conductivity. Each neutral point bus bar 48 includes a bus bar main body 48a and a coil wire holding portion 48b. The bus bar main body 48a has a circular arc shape extending in the circumferential direction when viewed in the vertical direction. The coil wire holding portion 48b extends toward the inner side in the radial direction from the bus bar main body 48a. A substantially U-shaped holding groove is formed at a front end of the coil wire holding portion 48b. Three coil wire holding portions 48b are formed at intervals in a circumferential direction of the bus bar main body 48a.

In the present example embodiment, four neutral point bus bars 48 are arranged at equal intervals in the circumferential direction.

The first lead wires 44 of the U-phase coil 43U, the V-phase coil 43V, and the W-phase coil 43W of each set are electrically connected to each neutral point bus bar 48. An end of the first lead wire 44 of each of the U-phase coil 43U, the V-phase coil 43V, and the W-phase coil 43W is sandwiched in the holding groove of the coil wire holding portion 48b. Thus, the ends of the three first lead wires 44 drawn out from the U-phase coil 43U, the V-phase coil 43V, and the W-phase coil 43W of each set are electrically connected to the coil wire holding portion 48b of one neutral point bus bar 48. The coil wire holding portion 48b and the first lead wire 44 may be fixed by caulking. Further, the coil wire holding portions 48b and the ends of the first lead wires 44 are fixed by laser welding or the like. In this manner, in each set, the U-phase coil 43U, the V-phase coil 43V, and the W-phase coil 43W are electrically connected to the neutral point bus bar 48.

The bus bar unit 60 has a substantially circular plate shape in which the entire bus bar unit 60 expands in the radial direction. The bus bar unit 60 includes bus bars 70 and a bus bar holder 61.

The bus bar holder 61 is provided on one side of the stator 40 in the vertical direction. In the present example embodiment, the bus bar holder 61 is disposed on the upper side of the stator 40.

The bus bar holder 61 is made of an insulating material. In the present example embodiment, the material of the bus bar holder 61 is an insulating resin. However, the material of the bus bar holder 61 may be other insulating materials.

Figure 3:
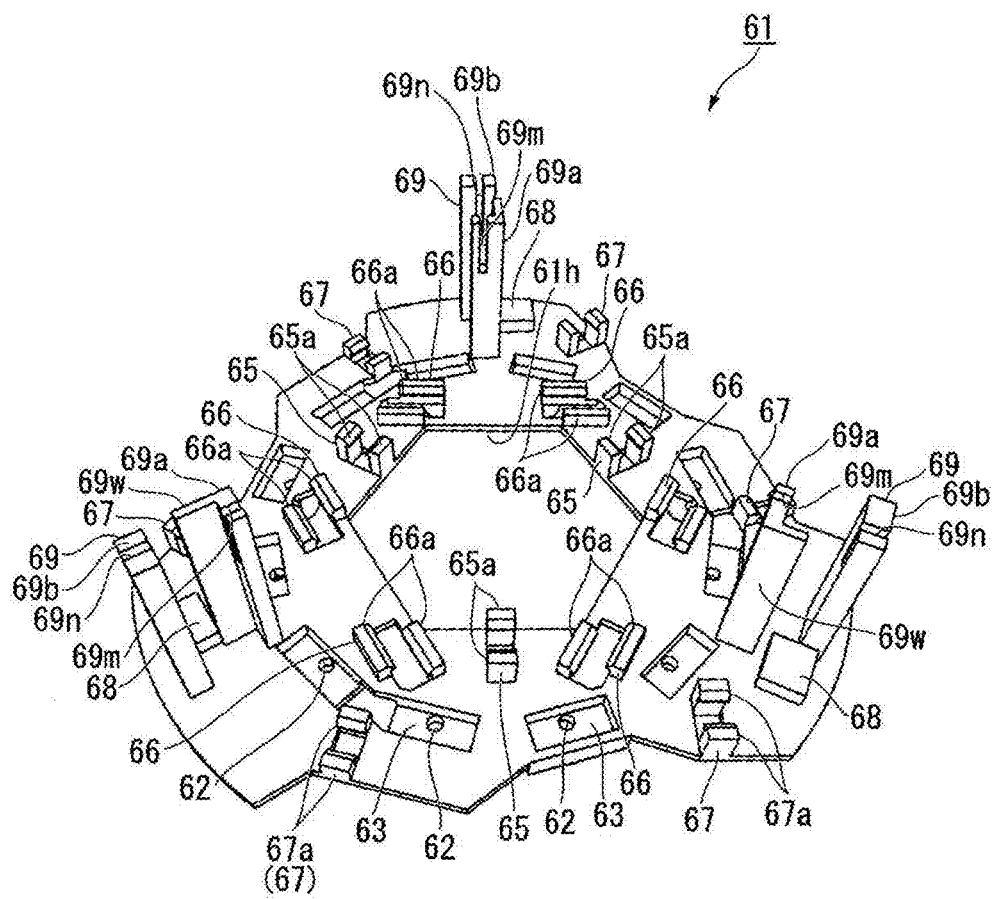
FIG. 3 is a perspective view of a bus bar holder of an example embodiment of the present disclosure when viewed obliquely from an upper side.

FIG. 3 is a perspective view of the bus bar holder of the example embodiment when viewed obliquely from an upper side.

As shown in FIG. 3, the bus bar holder 61 is a substantially plate-shaped member. When viewed in the vertical direction, an outer shape of the bus bar holder 61 is a substantially triangle. The bus bar holder 61 has a rotationally symmetrical shape about the central axis J at every 120°. The bus bar holder 61 includes a through hole 61h passing through a center portion thereof in the vertical direction. The bus bar holder 61 is fitted into an inner side of the housing (not shown) in the radial direction.

The bus bar holder 61 includes a lead wire support hole 62. The lead wire support hole 62 passes through the bus bar holder 61 in the vertical direction. A plurality of lead wire support holes 62 are formed at intervals in the circumferential direction. In the present example embodiment, the number of lead wire support holes 62 is the same as the number of second lead wires 45. That is, the number of lead wire support holes 62 is twelve.

The bus bar holder 61 includes a recessed portion 63 recessed downward in the vertical direction on an upper surface thereof. The recessed portion 63 is formed around each lead wire support hole 62.

Figure 4:
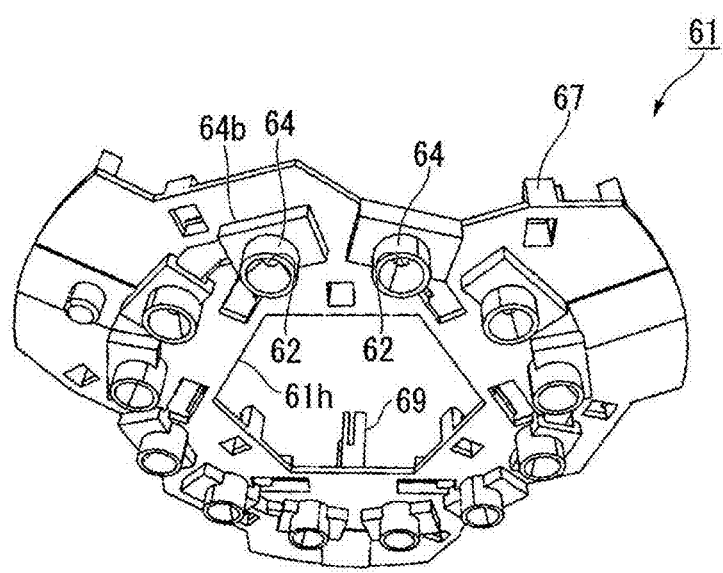
FIG. 4 is a perspective view of a bus bar holder of an example embodiment of the present disclosure when viewed obliquely from a lower side.

FIG. 4 is a perspective view of the bus bar holder of the example embodiment when viewed obliquely from a lower side.

As shown in FIG. 4, the bus bar holder 61 includes a lead wire guide portion 64 on a lower surface. A plurality of lead wire guide portions 64 are formed at intervals in the circumferential direction. The number of lead wire guide portions 64 is the same as the number of lead wire support holes 62.

Each of the lead wire guide portions 64 has a cylindrical shape and extends downward in the vertical direction. The lead wire guide portion 64 surrounds an outer circumferential side of the lead wire support hole 62 on the lower surface of the bus bar holder 61.

A reinforcing base portion 64b is formed on an upper end of the lead wire guide portion 64. The reinforcing base portion 64b expands outward in the radial direction from an outer side surface of the lead wire guide portion 64 along the bus bar holder 61. In the bus bar holder 61, a thickness in the vertical direction of an outer circumferential side of each lead wire guide portion 64 has a great value due to the reinforcing base portion 64b. Thereby, the rigidity of the lead wire guide portion 64 is enhanced.

As shown in FIG. 3, the bus bar holder 61 includes a first clamping portion(clamping portion) 65, a second clamping portion (clamping portion) 66, a third clamping portion 67, and a bus bar support 68, and a terminal holding portion 69 on the upper surface thereof.

The first clamping portion 65 is formed on an outer side in the radial direction of the through hole 61h of the bus bar holder 61. A plurality of first clamping portions 65 are formed at equal intervals in the circumferential direction. In the present example embodiment, three first clamping portions 65 are formed at equal intervals in the circumferential direction. Each of the first clamping portions 65 includes a pair of claw members 65a. Each of the claw members 65a extends upward in the vertical direction. The pair of claw members 65a face each other at an interval in the radial direction. The interval between the pair of claw members 65a is narrower than the width of a first bus bar stretched portion 73a to be described below. The pair of claw members 65a are elastically deformed so that the first bus bar stretched portion 73a is sandwiched.

Two second clamping portions 66 are formed between the first clamping portions 65 adjacent to each other in the circumferential direction. The second clamping portion 66 includes a pair of claw members 66a. The pair of claw members 66a face each other at an interval in the radial direction. The second clamping portion 66 protrudes upward in the vertical direction from the upper surface of the bus bar holder 61. The height in an axial direction of the second clamping portion 66 is smaller than that in the axial direction of the first clamping portion 65. The interval between the pair of claw members 66a is narrower than the width of the first bus bar stretched portion 73a to be described below. The pair of claw members 66a are elastically deformed so that the first bus bar stretched portion 73a is sandwiched.

The third clamping portion 67 is formed on an outer circumference of the bus bar holder 61. A plurality of third clamping portions 67 are formed in the circumferential direction. In the present example embodiment, six third clamping portions 67 are formed at intervals in the circumferential direction. Each of the third clamping portions 67 includes a pair of claw members 67a. The pair of claw members 67a face each other at an interval in the radial direction. Each of the claw members 67a extends upward in the vertical direction. The third clamping portion 67 has a height substantially the same as that of the first clamping portion 65 in the axial direction. Further, the height in the axial direction of the third clamping portion 67 is greater than that in the axial direction of the second clamping portion.

As described below, the second clamping portion 66 clamps a first layer bus bar 71. Further, the first clamping portion 65 and the third clamping portion 67 clamp a second layer bus bar 72 passing above the first layer bus bar 71 in the axial direction. According to the present example embodiment, the height in the axial direction of the clamping portion (the second clamping portion 66) which is configured to sandwich the first layer bus bar 71 thereinto, is lower than the heights in the axial direction of the clamping portions (the first clamping portion 65 and the third clamping portion 67) which are configured to sandwich the second layer bus bar 72 thereinto. That is, the axial position of a front end of the second clamping portion 66 is different from the axial positions of front ends of the first clamping portion 65 and the third clamping portion 67.

The bus bar support 68 is formed on the outer circumference of the bus bar holder 61. A plurality of bus bar supports 68 are formed in the circumferential direction. In the present example embodiment, three bus bar supports 68 are formed at intervals in the circumferential direction. Each of the bus bar supports 68 is disposed adjacent to one side in the circumferential direction with respect to the terminal holding portion 69. The bus bar support 68 protrudes upward in the vertical direction from the upper surface of the bus bar holder 61. The bus bar support 68 has a lower height than the third clamping portion 67 in the axial direction.

The terminal holding portion 69 is formed on the outer circumference of the bus bar holder 61. A plurality of terminal holding portions 69 are formed in the circumferential direction. In the present example embodiment, three terminal holding portions 69 are formed at intervals in the circumferential direction. Each of the terminal holding portions 69 includes a pair of columnar members 69a and 69b. The pair of columnar members 69a and 69b face each other at an interval in the radial direction. The columnar members 69a and 69b each extend upward in the vertical direction from the upper surface of the bus bar holder 61. The columnar members 69a and 69b include holding grooves 69m and 69n. The holding grooves 69m and 69n extend downward in the vertical direction (that is, along the axial direction) from upper ends of the columnar members 69a and 69b to intermediate portions in the vertical direction of the columnar members 69a and 69b. Upper ends of the holding grooves 69m and 69n open upward at the upper ends of the columnar members 69a and 69b.

The columnar member 69a located on the inner side in the radial direction includes a wall portion 69w extending outward in the radial direction from one end in the circumferential direction. A gap is formed in the circumferential direction between the wall portion 69w of the columnar member 69a and the columnar member 69b.

The bus bar holder 61 is located above the first lead wire 44 extending upward in the vertical direction from each coil 43 of the stator 40 shown in FIG. 1. The second lead wire 45 passes through the lead wire support hole 62 through an inside of the lead wire guide portion 64 and protrudes to the upper surface side of the bus bar holder 61.

On the lower surface side of the bus bar holder 61, the periphery of the second lead wire 45 is surrounded by the lead wire guide portion 64. Thereby, the second lead wire 45 is prevented from being short-circuited by coming into contact with the first lead wire 44, other second lead wires 45, the neutral point bus bar 48, the coils 43, and the like on the lower side of the bus bar holder 61.

Figure 5:
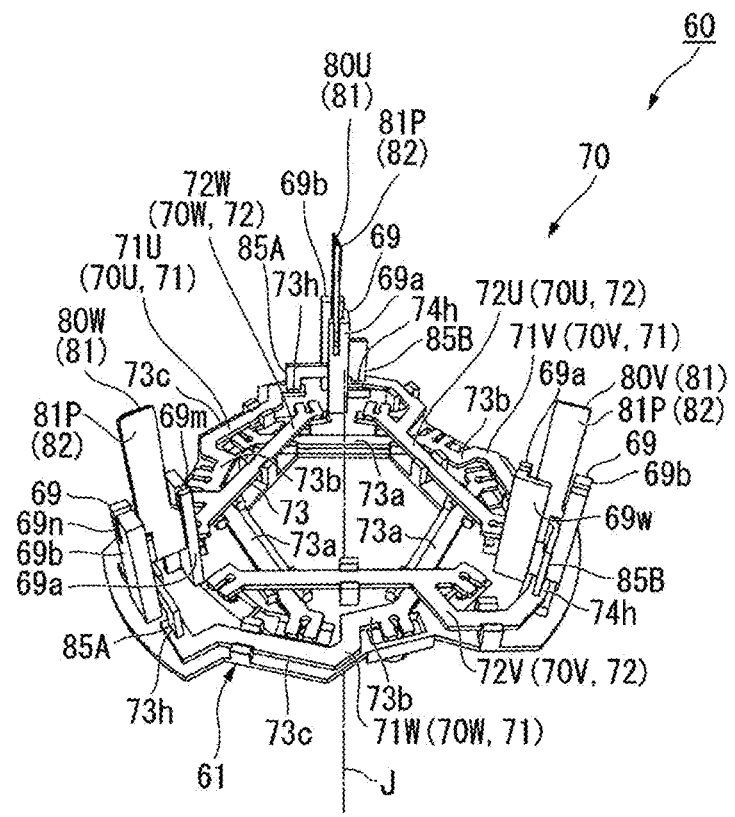
FIG. 5 is a perspective view illustrating a state in which bus bars are assembled to a bus bar holder of an example embodiment of the present disclosure.
Figure 6:
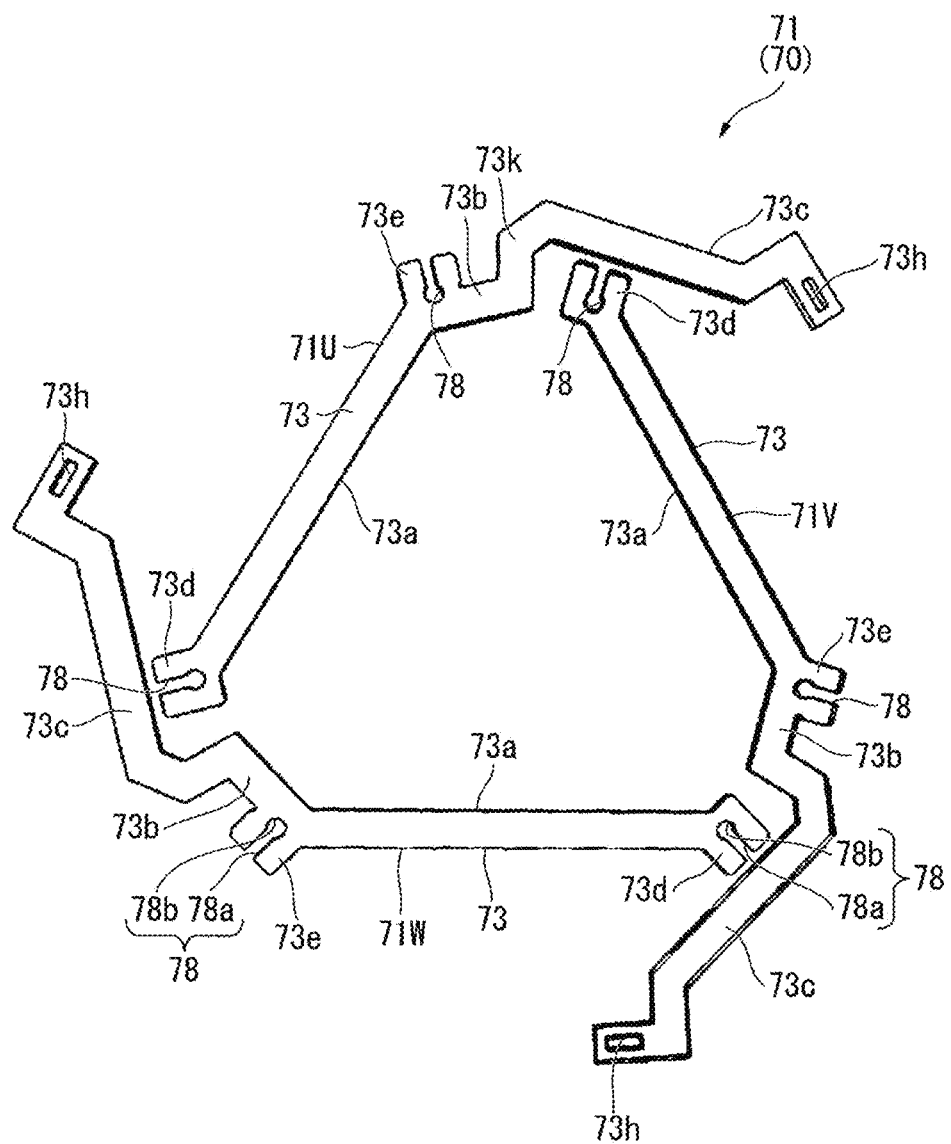
FIG. 6 is a perspective view illustrating a first layer bus bar of bus bars of an example embodiment of the present disclosure.
Figure 7:
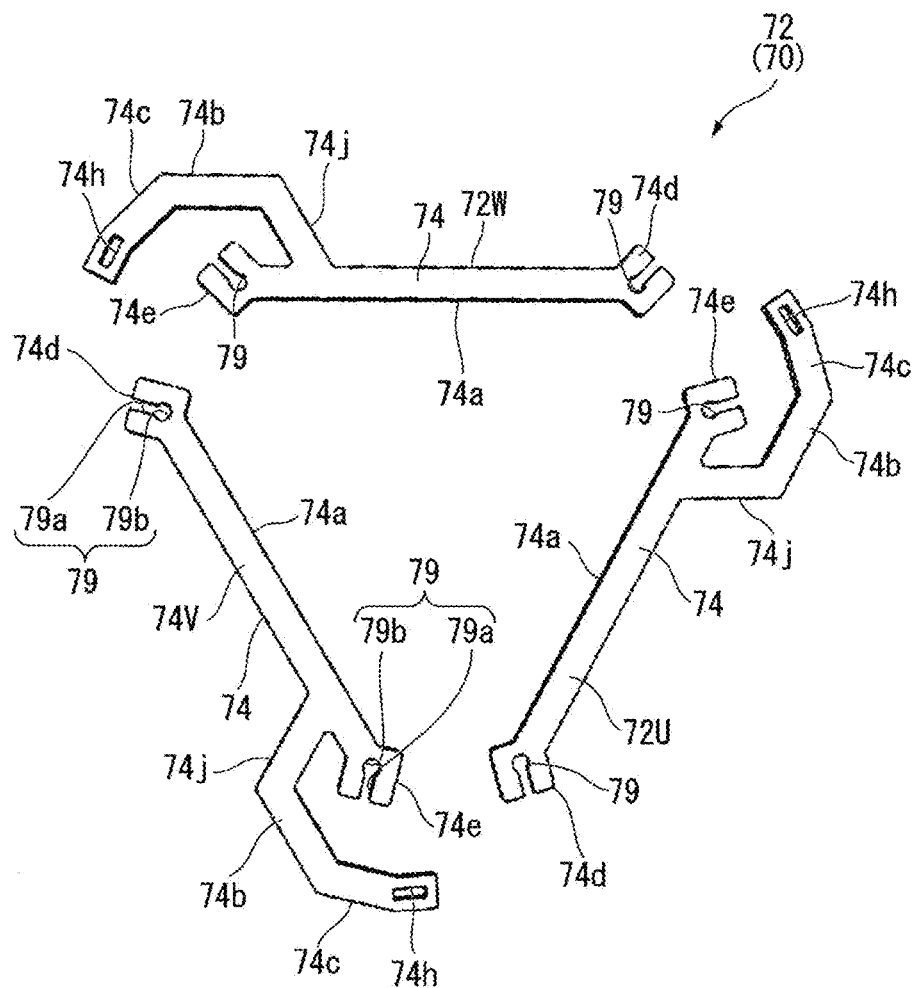
FIG. 7 is a perspective view illustrating a second layer bus bar of bus bars of an example embodiment of the present disclosure.

FIG. 5 is a perspective view illustrating a state in which the bus bars are assembled to the bus bar holder of the example embodiment. FIG. 6 is a perspective view illustrating the first layer bus bar of the bus bars of the example embodiment. FIG. 7 is a perspective view illustrating the second layer bus bar of the bus bars of the example embodiment.

As shown in FIG. 5, the bus bars 70 are fixed to the bus bar holder 61. The bus bars 70 include a U-phase bus bar group 70U, a V-phase bus bar group 70V, and a W-phase bus bar group 70W.

The U-phase bus bar group 70U includes a U-phase first layer bus bar 71U, a U-phase second layer bus bar 72U, and a U-phase external connection terminal (external connection terminal) 80U.

The V-phase bus bar group 70V includes a V-phase first layer bus bar 71V, a V-phase second layer bus bar 72V, and a V-phase external connection terminal (external connection terminal) 80V.

The W-phase bus bar group 70W includes a W-phase first layer bus bar 71W, a W-phase second layer bus bar 72W, and a W-phase external connection terminal (external connection terminal) 80W.

Each of the U-phase bus bar group 70U, the V-phase bus bar group 70V, and the W-phase bus bar group 70W is arranged in rotational symmetry about the central axis J at every 120°.

Further, the bus bars 70 include a first layer bus bar (first bus bar) 71 and a second layer bus bar (bus bar) 72.

As shown in FIG. 6, the first layer bus bar 71 includes the U-phase first layer bus bar 71U, the V-phase first layer bus bar 71V, and the W-phase first layer bus bar 71W. The positions in the axial direction of the U-phase first layer bus bar 71U, the V-phase first layer bus bar 71V, and the W-phase first layer bus bar 71W coincide with each other.

As shown in FIG. 7, the second layer bus bar 72 includes the U-phase second layer bus bar 72U, the V-phase second layer bus bar 72V, and the W-phase second layer bus bar 72W. The positions in the axial direction of the U-phase second layer bus bar 72U, the V-phase second layer bus bar 72V, and the W-phase second layer bus bar 72W coincide with each other.

As shown in FIG. 5, the U-phase second layer bus bar 72U, the V-phase second layer bus bar 72V, and the W-phase second layer bus bar 72W are arranged on an upper side in the vertical direction (one side in the axial direction) with respect to the U-phase first layer bus bar 71U, the V-phase first layer bus bar 71V, and the W-phase first layer bus bar 71W.

Figure 8:
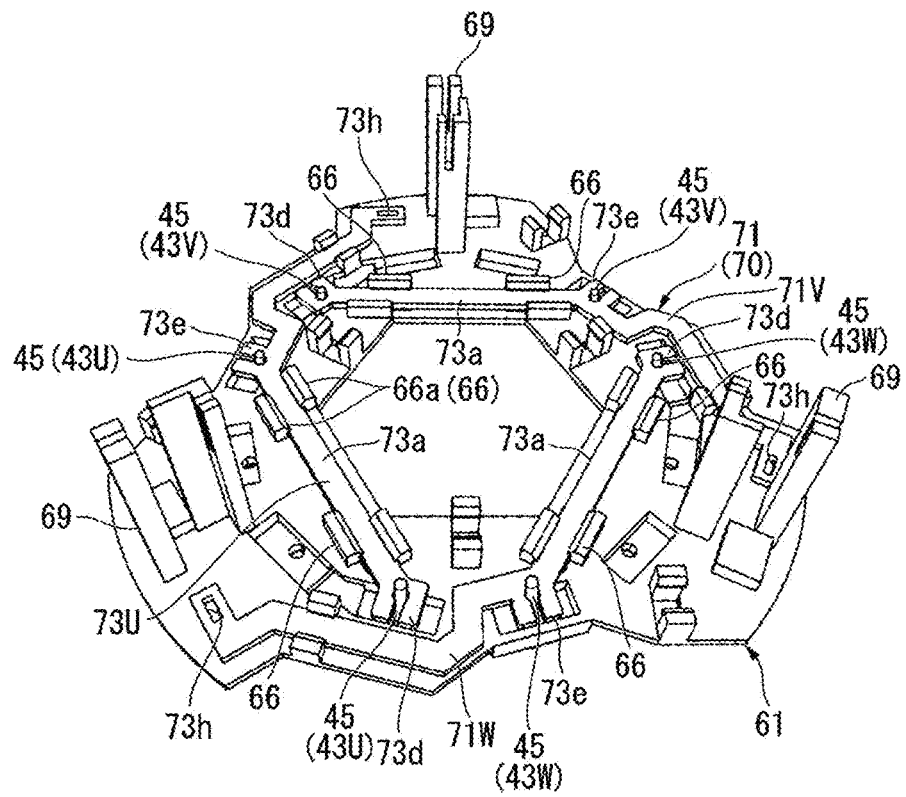
FIG. 8 is a perspective view illustrating a state in which a first layer bus bar of an example embodiment of the present disclosure is assembled to a bus bar holder.

FIG. 8 is a perspective view illustrating a state in which the first layer bus bar of the example embodiment is assembled to the bus bar holder.

As shown in FIG. 8, the U-phase first layer bus bar 71U, the V-phase first layer bus bar 71V, and the W-phase first layer bus bar 71W are located on an upper side (one side in the axial direction) of the bus bar holder 61. Each of the U-phase first layer bus bar 71U, the V-phase first layer bus bar 71V, and the W-phase first layer bus bar 71W extends along a plane perpendicular to the vertical direction. Each of the U-phase first layer bus bar 71U, the V-phase first layer bus bar 71V, and the W-phase first layer bus bar 71W has a plate shape. The U-phase first layer bus bar 71U, the V-phase first layer bus bar 71V, and the W-phase first layer bus bar 71W are arranged with the axial direction as a plate thickness direction.

As shown in FIG. 6, the U-phase first layer bus bar 71U, the V-phase first layer bus bar 71V, and the W-phase first layer bus bar 71W are composed of first bus bar members 73 having the same shape. The first bus bar member 73 is manufactured by punching a metal plate that is a conductive material. It is not necessary to prepare a plurality of molds, devices, and jigs in manufacturing the U-phase first layer bus bar 71U, the V-phase first layer bus bar 71V, and the W-phase first layer bus bar 71W. Thus, the manufacturing process of the U-phase first layer bus bar 71U, the V-phase first layer bus bar 71V, and the W-phase first layer bus bar 71W may be simplified, thereby reducing the manufacturing cost.

The first bus bar member 73 includes the first bus bar stretched portion (first stretched portion) 73a, a second bus bar stretched portion 73b, and a third bus bar stretched portion 73c. Each of the first bus bar stretched portion 73a, the second bus bar stretched portion 73b, and the third bus bar stretched portion 73c extends in a linear shape when viewed in the vertical direction.

The first bus bar stretched portion 73a extends in a direction perpendicular to the radial direction.

One side end of the second bus bar stretched portion 73b in a longitudinal direction is connected to the other side end of the first bus bar stretched portion 73a in the longitudinal direction. The second bus bar stretched portion 73b is bent at a different angle with respect to the first bus bar stretched portion 73a and extended.

One side end of the third bus bar stretched portion 73c in the longitudinal direction is connected to the other side end of the second bus bar stretched portion 73b in the longitudinal direction through a bent portion 73k. The bent portion 73k is bent outward in the radial direction from the other side end of the second bus bar stretched portion 73b in the longitudinal direction.

The first bus bar member 73 further includes lead wire connection portions 73d and 73e and a terminal insertion hole (first through hole) 73h.

The lead wire connection portion 73d is formed at one side end of the first bus bar stretched portion 73a in the longitudinal direction. The lead wire connection portion 73d extends outward in the radial direction from the one side end of the first bus bar stretched portion 73a in the longitudinal direction. A lead wire holding groove 78 is formed at a front end portion of the lead wire connection portion 73d on an outer side in the radial direction. The lead wire holding groove 78 opens outward in the radial direction at the front end portion of the lead wire connection portion 73d. The lead wire holding groove 78 may also be expressed as a notch portion that opens outward in the radial direction. The lead wire holding groove 78 includes an introduction groove portion 78a and a holding groove portion 78b. The introduction groove portion 78a is formed on the front end portion side of the lead wire connection portion 73d. The introduction groove portion 78a has a groove width smaller than that of an outer diameter of the second lead wire 45. The holding groove portion 78b is continuously formed on an inner side in the radial direction with respect to the introduction groove portion 78a. The holding groove portion 78b has a circular arc shape having an inner diameter slightly greater than the outer diameter of the second lead wire 45.

The lead wire connection portion 73e is formed at the one side end of the second bus bar stretched portion 73b in the longitudinal direction. The lead wire connection portion 73e extends outward in the radial direction from the one side end of the second bus bar stretched portion 73b in the longitudinal direction. The lead wire connection portion 73e includes a lead wire holding groove 78 at a front end portion on an outer side in the radial direction, similarly to the lead wire connection portion 73d. The lead wire holding groove 78 opens outward in the radial direction at the front end portion of the lead wire connection portion 73e. The lead wire holding groove 78 includes an introduction groove portion 78a and a holding groove portion 78b.

The terminal insertion hole 73h is formed at the other side end of the third bus bar stretched portion 73c in the longitudinal direction. The terminal insertion hole 73h passes through the first bus bar member 73 in the vertical direction.

As shown in FIG. 8, when the U-phase first layer bus bar 71U, the V-phase first layer bus bar 71V, and the W-phase first layer bus bar 71W are arranged on the bus bar holder 61, the U-phase first layer bus bar 71U, the V-phase first layer bus bar 71V, and the W-phase first layer bus bar 71W are arranged so as to form a triangle when viewed in the vertical direction.

In each of the U-phase first layer bus bar 71U, the V-phase first layer bus bar 71V, and the W-phase first layer bus bar 71W, both end portions of the first bus bar stretched portion 73a in the longitudinal direction are clamped by the second clamping portions 66 of the bus bar holder 61. In each second clamping portion 66, the first bus bar stretched portion 73a is clamped between the pair of claw members 66a. The interval between the pair of claw members 66a is narrower than the width of the first bus bar stretched portion 73a. Thus, by sandwiching the first bus bar stretched portion 73a between the pair of claw members 66a, the pair of claw members 66a are elastically deformed so that the second clamping portion 66 firmly holds the first bus bar stretched portion 73a.

In this manner, the U-phase first layer bus bar 71U, the V-phase first layer bus bar 71V, and the W-phase first layer bus bar 71W are each held by two second clamping portions 66 between the lead wire connection portions 73d and 73e.

The U-phase first layer bus bar 71U is connected to the second lead wire 45 of the U-phase coil 43U. The V-phase first layer bus bar 71V is connected to the second lead wire 45 of the V-phase coil 43V, and the W-phase first layer bus bar 71W is connected to the second lead wire 45 of the W-phase coil 43W.

The second lead wires 45 are electrically connected to the lead wire connection portions 73d and 73e of each of the U-phase first layer bus bar 71U, the V-phase first layer bus bar 71V, and the W-phase first layer bus bar 71W. In the lead wire connection portions 73d and 73e, a front end portion of the second lead wire 45 protruding upward from the bus bar holder 61 is inserted into the holding groove portion 78b (see FIG. 6). In the lead wire connection portions 73d and 73e into which the front end portions of the second lead wires 45 are inserted, both sides of the introduction groove portion 78a are sandwiched by a tool (not shown) and caulked. Thereafter, the front end portion of the second lead wire 45 and the lead wire connection portions 73d and 73e are laser welded. Thus, the lead wire connection portions 73d and 73e and the second lead wires 45 are easily and securely connected.

In each of the U-phase first layer bus bar 71U, the V-phase first layer bus bar 71V, and the W-phase first layer bus bar 71W held by the bus bar holder 61, the terminal insertion holes 73h is located on the other side of the terminal holding portion 69 in the circumferential direction.

Figure 9:
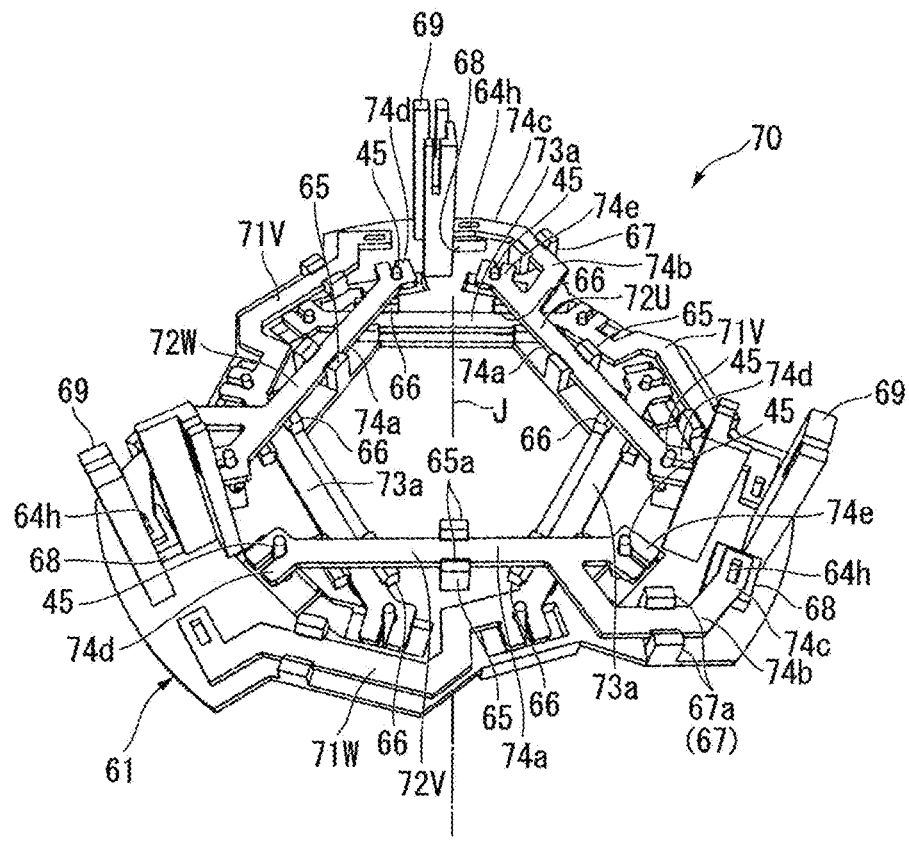
FIG. 9 is a perspective view illustrating a state in which a second layer bus bar of an example embodiment of the present disclosure is assembled to a bus bar holder.

FIG. 9 is a perspective view illustrating a state in which the second layer bus bar of the example embodiment is assembled to the bus bar holder.

As shown in FIG. 9, the U-phase second layer bus bar 72U, the V-phase second layer bus bar 72V, and the W-phase second layer bus bar 72W are located above the U-phase first layer bus bar 71U, the V-phase first layer bus bar 71V, and the W-phase first layer bus bar 71W in the vertical direction. The U-phase second layer bus bar 72U, the V-phase second layer bus bar 72V, and the W-phase second layer bus bar 72W extend along a plane perpendicular to the vertical direction. Each of the U-phase second layer bus bar 72U, the V-phase second layer bus bar 72V, and the W-phase second layer bus bar 72W has a plate shape. The U-phase second layer bus bar 72U, the V-phase second layer bus bar 72V, and the W-phase second layer bus bar 72W are arranged with the axial direction as a plate thickness direction.

As shown in FIG. 7, the U-phase second layer bus bar 72U, the V-phase second layer bus bar 72V, and the W-phase second layer bus bar 72W are composed of second bus bar members 74 having the same shape. The second bus bar member 74 is manufactured by punching a metal plate that is a conductive material.

The second bus bar member 74 includes a fourth bus bar stretched portion (second stretched portion) 74a, a fifth bus bar stretched portion 74b, and a sixth bus bar stretched portion 74c. Each of the fourth bus bar stretched portion 74a, the fifth bus bar stretched portion 74b, and the sixth bus bar stretched portion 74c extends in a linear shape when viewed in the vertical direction.

The fourth bus bar stretched portion 74a extends in a direction perpendicular to the radial direction.

One side end of the fifth bus bar stretched portion 74b in the longitudinal direction is connected to an intermediate portion of the fourth bus bar stretched portion 74a in the longitudinal direction. The fifth bus bar stretched portion 74b is connected to the fourth bus bar stretched portion 74a through a connection portion 74j. The connection portion 74j extends outward in the radial direction from the fourth bus bar stretched portion 74a. The fifth bus bar stretched portion 74b extends substantially in parallel with the fourth bus bar stretched portion 74a.

One side end of the sixth bus bar stretched portion 74c in the longitudinal direction is connected to the other side end of the fifth bus bar stretched portion 74b in the longitudinal direction. The sixth bus bar stretched portion 74c is bent at a different angle with respect to the fifth bus bar stretched portion 74b and extended.

The second bus bar member 74 further includes lead wire connection portions 74d and 74e and a terminal insertion hole (second through hole) 74h.

The lead wire connection portion 74d is formed at one side end of the fourth bus bar stretched portion 74a in the longitudinal direction. The lead wire connection portion 74d extends outward in the radial direction from the one side end of the fourth bus bar stretched portion 74a in the longitudinal direction. The lead wire connection portion 74d includes a lead wire holding groove 79 at a front end portion on the outer side in the radial direction. The lead wire holding groove 79 opens outward in the radial direction at the front end portion of the lead wire connection portion 74d. The lead wire holding groove 79 includes an introduction groove portion 79a and a holding groove portion 79b. The introduction groove portion 79a is formed on the front end portion side of the lead wire connection portion 74d. The introduction groove portion 79a has a groove width smaller than that of the outer diameter of the second lead wire 45. The holding groove portion 79b is formed continuously on an inner side in the radial direction with respect to the introduction groove portion 79a. The holding groove portion 79b has a circular arc shape having an inner diameter slightly greater than the outer diameter of the second lead wire 45.

The lead wire connection portion 74e is formed at the other side end of the fourth bus bar stretched portion 74a in the longitudinal direction. The lead wire connection portion 74e extends outward in the radial direction from the other side end of the fourth bus bar stretched portion 74a in the longitudinal direction. The lead wire connection portion 74e includes a lead wire holding groove 79 at a front end portion on the outer side in the radial direction, similarly to the lead wire connection portion 74d. The lead wire holding groove 79 opens outward in the radial direction at the front end portion of the lead wire connection portion 74e. The lead wire holding groove 79 includes an introduction groove portion 79a and a holding groove portion 79b.

The terminal insertion hole 74h is formed at the other side end of the sixth bus bar stretched portion 74c in the longitudinal direction. The terminal insertion hole 74h passes through the second bus bar member 74 in the vertical direction.

As shown in FIG. 9, when the U-phase second layer bus bar 72U, the V-phase second layer bus bar 72V, and the W-phase second layer bus bar 72W are arranged on the bus bar holder 61, the U-phase second layer bus bar 72U, the V-phase second layer bus bar 72V, and the W-phase second layer bus bar 72W are arranged so as to form a triangle when viewed in the vertical direction.

The triangle constituted by the U-phase first phase bus bar 71U, the V-phase first phase bus bar 71V, and the W-phase first phase bus bar 71W and the triangle constituted by the U-phase second phase bus bar 72U, the V-phase second phase bus bar 72V, and the W-phase second phase bus bar 72W are arranged such that positions of vertexes thereof are different from each other. One of the vertexes of the triangle constituted by the first layer bus bar 71 faces upward in the drawing when viewed in the vertical direction. On the other hand, one of the vertexes of the triangle constituted by the second layer bus bar 72 faces downward in the drawing.

In addition, the positions of the lead wire connection portions 73d and 73e in the circumferential direction of the U-phase first layer bus bar 71U, the V-phase first layer bus bar 71V, and the W-phase first layer bus bar 71W are different from the positions of the lead wire connection portions 74d and 74e in the circumferential direction of the U-phase second layer bus bar 72U, the V-phase second layer bus bar 72V, and the W-phase second layer bus bar 72W.

In each of the U-phase second layer bus bar 72U, the V-phase second layer bus bar 72V, and the W-phase second layer bus bar 72W, the fourth bus bar stretched portion 74a is located on the opposite side of the first bus bar stretched portion 73a of each of the U-phase first layer bus bar 71U, the V-phase first layer bus bar 71V, and the W-phase first layer bus bar 71W with respect to the central axis J. Further, in each of the U-phase second layer bus bar 72U, the V-phase second layer bus bar 72V, and the W-phase second layer bus bar 72W, the fourth bus bar stretched portion 74a extends in parallel with the first bus bar stretched portion 73a.

In each of the U-phase second layer bus bar 72U, the V-phase second layer bus bar 72V, and the W-phase second layer bus bar 72W, the intermediate portion of the fourth bus bar stretched portion 74a in the longitudinal direction is clamped by the first clamping portion 65 of the bus bar holder 61. Each fourth bus bar stretched portion 74a is clamped between the pair of claw members 65a in each first clamping portion 65. The interval between the pair of claw members 65a is narrower than the width of the fourth bus bar stretched portion 74a. Thus, by sandwiching the fourth bus bar stretched portion 74a between the pair of claw members 65a, the pair of claw members 65a are elastically deformed so that the first clamping portion 65 firmly holds the fourth bus bar stretched portion 74a.

In this manner, the U-phase second layer bus bar 72U, the V-phase second layer bus bar 72V, and the W-phase second layer bus bar 72W are each held by the first clamping portions 65 between the lead wire connection portions 74d and 74e.

Further, in each of the U-phase second layer bus bar 72U, the V-phase second layer bus bar 72V, and the W-phase second layer bus bar 72W, the intermediate portion of the fifth bus bar stretched portion 74b in the longitudinal direction is clamped by the third clamping portion 67 of the bus bar holder 61. The fifth bus bar stretched portion 74b is clamped between the pair of claw members 67a in the third clamping portion 67. The interval between the pair of claw members 67a is narrower than the width of the fifth bus bar stretched portion 74b. Thus, by sandwiching the fifth bus bar stretched portion 74b between the pair of claw members 67a, the pair of claw members 67a are elastically deformed so that the third clamping portion 67 firmly holds the fifth bus bar stretched portion 74b.

In this manner, each of the U-phase second layer bus bar 72U, the V-phase second layer bus bar 72V, and the W-phase second layer bus bar 72W is held by the bus bar holder 61.

Further, in each of the U-phase second layer bus bar 72U, the V-phase second layer bus bar 72V, and the W-phase second layer bus bar 72W, both end portions of the fourth bus bar stretched portion 74a in the longitudinal direction are supported on the second clamping portions 66 of the bus bar holder 61. The U-phase second layer bus bar 72U, the V-phase second layer bus bar 72V, and the W-phase second layer bus bar 72W are supported on the second clamping portions 66, and thus gaps are secured in the vertical direction between the U-phase first layer bus bar 71U, the V-phase first layer bus bar 71V, and the W-phase first layer bus bar 71W, which are clamped by the second clamping portion 66. Thereby, the U-phase first layer bus bar 71U, the V-phase first layer bus bar 71V, and the W-phase first layer bus bar 71W are avoided from being short-circuited to the U-phase second layer bus bar 72U, the V-phase second layer bus bar 72V, and the W-phase second layer bus bar 72W.

The U-phase second layer bus bar 72U is connected to the second lead wire 45 of the U-phase coil 43U. The V-phase second layer bus bar 72V is connected to the second lead wire 45 of the V-phase coil 43V, and the W-phase second layer bus bar 72W is connected to the second lead wire 45 of the W-phase coil 43W.

The second lead wires 45 are electrically connected to the lead wire connection portions 74d and 74e of each of the U-phase second layer bus bar 72U, the V-phase second layer bus bar 72V, and the W-phase second layer bus bar 72W. In each of the lead wire connection portions 74d and 74e, the front end portion of the second lead wire 45 protruding upward from the bus bar holder 61 is inserted into the holding groove portion 79b. In each of the lead wire connection portions 74d and 74e into which the front end portions of the second lead wires 45 are inserted, both sides of the introduction groove portion 79a are sandwiched by a tool (not shown) and caulked. Thereafter, the front end portion of the second lead wire 45 and each of the lead wire connection portions 74d and 74e are laser welded. Thus, the lead wire connection portions 74d and 74e and the second lead wires 45 are easily and securely connected.

In each of the U-phase second layer bus bar 72U, the V-phase second layer bus bar 72V, and the W-phase second layer bus bar 72W, the sixth bus bar stretched portion 74c is supported on the bus bar support 68 of the bus bar holder 61. Thus, the terminal insertion hole 74h formed in the sixth bus bar stretched portion 74c is located on the other side of the terminal holding portion 69 in the circumferential direction.

Thus, when viewed in the axial direction, the first layer bus bar 71U of the U-phase bus bar group 70U passes under the second layer bus bars 72V and 72W of the V-phase bus bar group 70V and the W-phase bus bar group 70W. Further, the first layer bus bar 71V of the V-phase bus bar group 70V passes under the second layer bus bars 72U and 72W of the U-phase bus bar group 70U and the W-phase bus bar group 70W. The first layer bus bar 71W of the W-phase bus bar group 70W passes under the second layer bus bars 72U and 72V of the U-phase bus bar group 70U and the V-phase bus bar group 70V.

As shown in FIG. 5, each of the U-phase external connection terminal 80U, the V-phase external connection terminal 80V, and the W-phase external connection terminal 80W is held by the terminal holding portion 69 of the bus bar holder 61. The U-phase external connection terminal 80U is connected to the U-phase first layer bus bar 71U and the U-phase second layer bus bar 72U. The V-phase external connection terminal 80V is connected to the V-phase first layer bus bar 71V and the V-phase second layer bus bar 72V. The W-phase external connection terminal 80W is connected to the W-phase first layer bus bar 71W and the W-phase second layer bus bar 72W.

The U-phase first layer bus bar 71U and the U-phase second layer bus bar 72U extend to the opposite sides from each other in the circumferential direction from the U-phase external connection terminal 80U connected thereto. The V-phase first layer bus bar 71V and the V-phase second layer bus bar 72V extend to the opposite sides from each other in the circumferential direction from the V-phase external connection terminal 80V connected thereto. The W-phase first layer bus bar 71W and the W-phase second layer bus bar 72W extend to the opposite sides from each other in the circumferential direction from the W-phase external connection terminal 80W connected thereto.

Each of the U-phase external connection terminal 80U, the V-phase external connection terminal 80V, and the W-phase external connection terminal 80W has a plate shape. The U-phase external connection terminal 80U, the V-phase external connection terminal 80V, and the W-phase external connection terminal 80W are composed of terminal members 81 having the same shape. The terminal member 81 is manufactured by pressing a metal plate that is a conductive material.

According to the present example embodiment, the second layer bus bars 72U, 72V, and 72W are arranged above the first layer bus bars 71U, 71V, and 71W, so that the bus bars 70 of the U-phase, the V-phase, and the W-phase may be arranged in upper and lower two layers in a superposing manner. Thereby, the bus bar unit 60 may be miniaturized in the vertical direction. In addition, when the bus bars 70 are arranged only in one layer without overlapping, it may be enlarged in the radial direction to avoid interference between the bus bars. On the other hand, the above-described bus bar unit 60 may be suppressed from being enlarged in the radial direction.

The first layer bus bars 71U, 71V, and 71W and the second layer bus bars 72U, 72V, and 72W extend to the opposite sides with respect to the external connection terminals 80U, 80V, and 80W in the circumferential direction. Thus, the directions of currents flowing through the first layer bus bars 71U, 71V, and 71W are opposite to the directions of currents flowing through the second layer bus bars 72U, 72V, and 72W with respect the external connection terminals 80U, 80V, and 80W, respectively. The directions of magnetic fields generated by the first layer bus bars 71U, 71V, and 71W are opposite to the directions of magnetic fields generated by the second layer bus bars 72U, 72V, and 72W located on the other side in the radial direction with respect to the central axis J, respectively. As a result, the magnetic fields generated by the first layer bus bars 71U, 71V, and 71W and the magnetic fields generated by the second layer bus bars 72U, 72V, and 72W may cancel each other, so that influences on the outside may be suppressed.

Thus, the bus bar unit 60 may be miniaturized while suppressing the influences of the magnetic fields on the outside.

According to the present example embodiment, each of the first bus bar stretched portions 73*a* of the first layer bus bars 71U, 71V, and 71W is located on the opposite side of each of the fourth bus bar stretched portions 74*a* of the second layer bus bars 72U, 72V, and 72W with respect to the central axis J. Thus, the effect of cancelling the magnetic fields generated by the first layer bus bars 71U, 71V, and 71W and the magnetic fields generated by the second layer bus bars 72U, 72V, and 72W is enhanced, so that influences on the outside may be effectively suppressed.

According to the present example embodiment, the first bus bar stretched portion 73*a* and the fourth bus bar stretched portion 74*a* extend in parallel with each other. Thus, the effect of cancelling the magnetic fields generated by the first layer bus bars 71U, 71V, and 71W and the magnetic fields generated by the second layer bus bars 72U, 72V, and 72W is further enhanced, so that the influences on the outside may be further effectively suppressed.

According to the present example embodiment, the first layer bus bar 71U of the U-phase bus bar group 70U passes under the second layer bus bars 72V and 72W of the V-phase bus bar group 70V and the W-phase bus bar group 70W. The first layer bus bar 71V of the V-phase bus bar group 70V passes under the second layer bus bars 72U and 72W of the U-phase bus bar group 70U and the W-phase bus bar group 70W. The first layer bus bar 71W of the W-phase bus bar group 70W passes under the second layer bus bars 72U and 72V of the U-phase bus bar group 70U and the V-phase bus bar group 70V.

In this manner, the bus bars 70 of the U-phase, the V-phase, and the W-phase may be efficiently arranged to be disposed in upper and lower two layers in a superposing manner. Thereby, the bus bar unit 60 may be miniaturized.

According to the present example embodiment, the first layer bus bars 71U, 71V, and 71W and the second layer bus bars 72U, 72V, and 72W have a plate shape, and are arranged with the axial direction as a thickness direction. Thereby, the bus bar unit 60 may be miniaturized in the axial direction.

According to the present example embodiment, the positions of the first layer bus bars 71U, 71V, and 71W in the axial direction coincide with each other, and the positions of the second layer bus bars 72U, 72V, and 72W in the axial direction coincide with each other.

Thus, the bus bars 70 of the U-phase, the V-phase, and the W-phase may be efficiently arranged to be disposed in upper and lower two layers in a superposing manner. Thereby, the bus bar unit 60 may be miniaturized.

According to the present example embodiment, the first layer bus bars 71U, 71V, and 71W have the same shape, and the second layer bus bars 72U, 72V, and 72W have the same shape. Thus, the first bus bar members 73 having the same shape may be used as the first layer bus bars 71U, 71V, and 71W. The second bus bar members 74 having the same shape may also be used as the second layer bus bars 72U, 72V, and 72W. Thereby, the number of types of components constituting the bus bar unit 60 may be reduced. As a result, the components cost may be reduced. Further, the first layer bus bars 71U, 71V, and 71W and the second layer bus bars 72U, 72V, and 72W may be mounted with the same type of components, and it is not necessary to mount different components for each phase. Accordingly, the mounting work of the first layer bus bars 71U, 71V, and 71W and the second layer bus bars 72U, 72V, and 72W may be performed efficiently.

According to the present example embodiment, the U-phase bus bar group 70U, the V-phase bus bar group 70V, and the W-phase bus bar group 70W are arranged in rotational symmetry about the central axis J at every 120°. Thus, the first layer bus bars 71U, 71V, and 71W may be mounted only by making the directions of the first bus bar members 73 different from each other in the circumferential direction. The second layer bus bars 72U, 72V, and 72W may also be mounted only by making the directions of the second bus bar members 74 different from each other in the circumferential direction. Accordingly, the mounting work of the first layer bus bars 71U, 71V, and 71W and the second layer bus bars 72U, 72V, and 72W may be performed efficiently.

According to the present example embodiment, the bus bar holder 61 has a rotationally symmetrical shape about the central axis J at every 120°. Thus, the positions of the U-phase, the V-phase, and the W-phase are not determined in the state of the bus bar unit 60. Accordingly, the bus bar unit 60 may be mounted on the stator 40 in any direction at every 120°. As a result, the manufacturing process of the bus bar unit 60 may be simplified, and also, the occurrence of an error in assembling may be suppressed.

According to the present example embodiment, the first layer bus bars 71U, 71V, and 71W are held by the second clamping portions 66 between the lead wire connection portions 73*d* and 73*e*. Further, the second layer bus bars 72U, 72V, and 72W are held by the first clamping portions 65 between the lead wire connection portions 74*d* and 74*e*. Thereby, the mounting position accuracy of the first layer bus bars 71U, 71V, and 71W and the second layer bus bars 72U, 72V, and 72W may be enhanced. In particular, since the lead wire connection portions 73*d*, 73*e*, 74*d*, and 74*e* are located on both sides of the second clamping portion 66 and both sides of the first clamping portion 65, the positional accuracy of the lead wire connection portions 73*d*, 73*e*, 74*d*, and 74*e* may be effectively enhanced. In addition, even when vibration is applied to the first layer bus bars 71U, 71V, and 71W and the second layer bus bars 72U, 72V, and 72W, load may be suppressed from being applied to the lead wire connection portions 73*d*, 73*e*, 74*d*, and 74*e*.

According to the present example embodiment, the motor 10 includes the above-described bus bar unit 60. Thus, in the motor 10, the bus bar unit 60 may be miniaturized while suppressing the influences of the magnetic fields on the outside.

Figure 10:
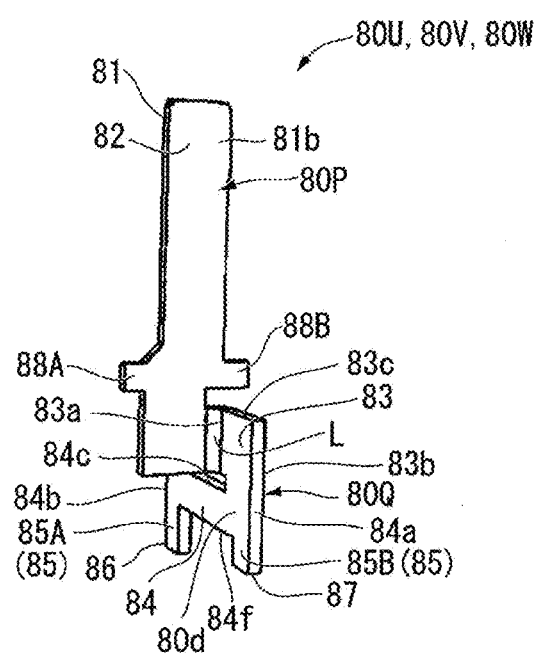
FIG. 10 is a perspective view illustrating an external connection terminal of a bus bar of an example embodiment of the present disclosure.
Figure 11:
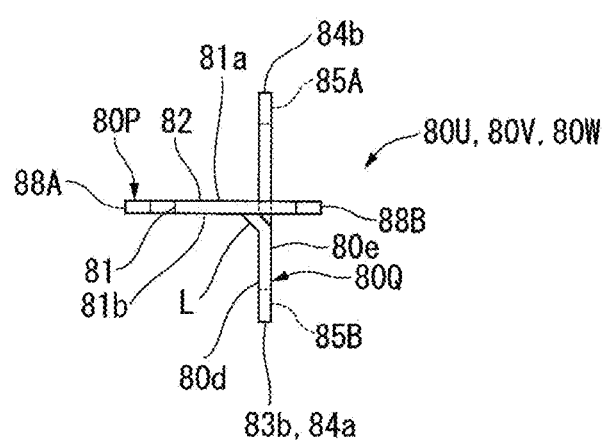
FIG. 11 is a plan view illustrating the external connection terminal of a bus bar of an example embodiment of the present disclosure.

FIG. 10 is a perspective view illustrating the external connection terminal of the bus bar of the example embodiment. FIG. 11 is a plan view illustrating the external connection terminal of the bus bar of the example embodiment.

As shown in FIGS. 10 and 11, each terminal member 81 includes a first plate portion 80P and a second plate portion 80Q. The first plate portion 80P and the second plate portion 80Q are connected to each other at a bending line L extending in the axial direction.

The first plate portion 80P is composed of a first terminal stretched portion 82 extending in the axial direction. The first terminal stretched portion 82 is a plate-shaped member and extends upward in the vertical direction. The first terminal stretched portion 82 includes protrusions 88A and 88B at a middle in the vertical direction. The protrusions 88A and 88B protrude to both sides in a width direction. That is, the first plate portion 80P includes a pair of protrusions 88A and 88B protruding to both sides in the width direction.

The protrusion 88A is located on one surface 80d side of the second plate portion 80Q. The protrusion 88B protrudes toward the other surface 80e side of the second plate portion 80Q. The first terminal stretched portion 82 extends from the one surface 80d to the other surface 80e of the second plate portion 80Q. Thus, the first plate portion 80P extends from the one surface 80d side to the other surface 80e side of the second plate portion 80Q when viewed in the axial direction.

The second plate portion 80Q is located on a base end side in a lower side of the first plate portion 80P in the vertical direction. The second plate portion 80Q faces in a direction different from that of the first plate portion 80P. The second plate portion 80Q is orthogonal to the first plate portion 80P. The second plate portion 80Q includes a second terminal stretched portion 83, a third terminal stretched portion 84, and a connection portion 85.

One end 83a of the second terminal stretched portion 83 in the width direction is connected to one end of a lower portion of the first terminal stretched portion 82 in the width direction. The second terminal stretched portion 83 extends perpendicularly to the first terminal stretched portion 82. The other end 83b of the second terminal stretched portion 83 in the width direction is located apart from the other surface 81b side of the first terminal stretched portion 82. An upper end 83c of the second terminal stretched portion 83 in the vertical direction is located to be spaced apart from the protrusion 88B in the vertical direction.

One side end 84a of the third terminal stretched portion 84 in the width direction is stretched downward continuously in the vertical direction from the second terminal stretched portion 83. The third terminal stretched portion 84 is orthogonal to the first terminal stretched portion 82. The other side end 84b of the third terminal stretched portion 84 in the width direction extends to one surface 81a side of the first terminal stretched portion 82. The other side end 84b of the third terminal stretched portion 84 in the width direction is located apart from the one surface 81a side of the first terminal stretched portion 82. An upper end 84c of the third terminal stretched portion 84 in the vertical direction is located to be spaced apart from the protrusion 88A in the vertical direction.

Thereby, the second plate portion 80Q extends from the one surface 81a side to the other surface 81b side of the first plate portion 80P when viewed in the axial direction.

The connection portion 85 includes a first connection portion 85A and a second connection portion 85B.

The first connection portion 85A is located on the other side of the third terminal stretched portion 84 in the width direction. That is, the first connection portion 85A is located on the one surface 81a side of the first plate portion 80P when viewed in the axial direction. The first connection portion 85A is a first convex portion 86 protruding downward in the vertical direction from a lower side end 84f of the third terminal stretched portion 84 in the vertical direction.

The second connection portion 85B is located on one side of the third terminal stretched portion 84 in the width direction. That is, the second connection portion 85B is located on the other surface 81b side of the first plate portion 80P when viewed in the axial direction. The second connection portion 85B is a second convex portion 87 protruding downward in the vertical direction from the lower side end 84f of the third terminal stretched portion 84 in the vertical direction.

The first connection portion 85A of the connection portion 85 is stretched downward longer than the second connection portion 85B in the vertical direction.

Figure 12:
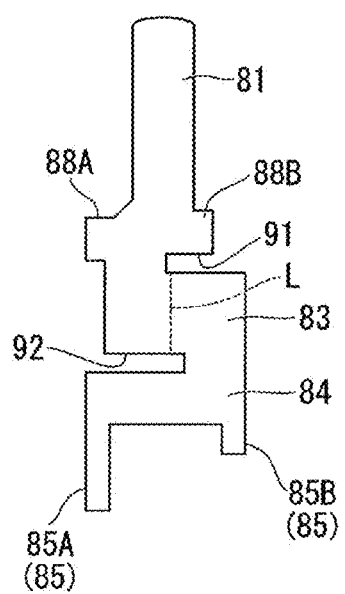
FIG. 12 is a view illustrating a terminal piece used when manufacturing an external connection terminal of an example embodiment of the present disclosure.

FIG. 12 is a view illustrating a terminal piece used when manufacturing the external connection terminal of the example embodiment.

As shown in FIG. 12, the terminal member 81 is formed by bending a terminal piece 90 at a bending line L, and the terminal piece 90 has an external shape corresponding to the first terminal stretched portion 82, the second terminal stretched portion 83, the third terminal stretched portion 84, and the connection portion 85. That is, in order to manufacture the terminal member 81, first, the terminal piece 90 is punched out from a metal plate by a punching process. Here, the terminal piece 90 includes a slit between the first terminal stretched portion 82 and the protrusion 88B, and the second terminal stretched portion 83. The terminal piece 90 includes a slit 92 between the third terminal stretched portion 84 and a lower end portion of the first terminal stretched portion 82.

Subsequently, the terminal piece 90 is bent by 90 degrees along the bending line L to obtain the terminal member 81. Thus, the terminal member 81 is formed by performing the punching process for forming the terminal piece 90 and the bending process for bending the terminal piece 90.

As shown in FIG. 5, the terminal member 81 is held by the terminal holding portion 69 of the bus bar holder 61. The terminal holding portion 69 holds the pair of protrusions 88A and 88B of the first plate portion 80P. The terminal member 81 is clamped between the pair of columnar members 69a and 69b in a state in which the first plate portion 80P (first terminal stretched portion 82) extends in the radial direction. The protrusions 88A and 88B of the terminal member 81 are inserted into the holding grooves 69m and 69n of the columnar members 69a and 69b from an upper side toward a lower side in the vertical direction. The terminal member 81 is positioned in the circumferential direction and the radial direction by inserting the protrusions 88A and 88B into the holding grooves 69m and 69n. Further, the protrusions 88A and 88B are positioned in the vertical direction by abutting on the lower ends of the holding grooves 69m and 69n. Further, the first terminal stretched portion 82 moves along the wall portion 69w formed on one columnar member 69a, so that falling in the circumferential direction may be suppressed.

In this manner, in the terminal member 81 held by the terminal holding portion 69, the first terminal stretched portion 82 protrudes upward in the vertical direction from the terminal holding portion 69.

The first connection portion 85A of the terminal member 81 held by the terminal holding portion 69 is inserted into the terminal insertion holes 73h of the U-phase first layer bus bar 71U, the V-phase first layer bus bar 71V, and the W-phase first layer bus bar 71W. The second connection portion 85B of the terminal member 81 is inserted into the terminal insertion holes 74h of the U-phase second layer bus bar 72U, the V-phase second layer bus bar 72V, and the W-phase second layer bus bar 72W. Thereafter, the first connection portion 85A and the second connection portion 85B of the terminal member 81 are laser welded to the U-phase first layer bus bar 71U, the V-phase first layer bus bar 71V, the W-phase first layer bus bar 71W, the U-phase second layer bus bar 72U, the V-phase second layer bus bar 72V, and the W-phase second layer bus bar 72W.

In this manner, the U-phase external connection terminal 80U, the V-phase external connection terminal 80V, and the W-phase external connection terminal 80W, which are composed of the terminal members 81, are held by the terminal holding portions 69 of the bus bar holder 61. The U-phase external connection terminal 80U extends upward (one side in the axial direction) from the U-phase first layer bus bar 71U and the U-phase second layer bus bar 72U. The V-phase external connection terminal 80V extends upward (one side in the axial direction) from the V-phase first layer bus bar 71V and the V-phase second layer bus bar 72V. The W-phase external connection terminal 80W extends upward (one side in the axial direction) from the W-phase first layer bus bar 71W and the W-phase second layer bus bar 72W.

According to the present example embodiment, the external connection terminals 80U, 80V, and 80W includes the first plate portion 80P and the second plate portion 80Q. The external connection terminals 80U, 80V, and 80W each may be manufactured by bending the flat plate-shaped terminal piece 90 at the bending line L. Thus, the external connection terminals 80U, 80V, and 80W may be manufactured with a high yield by taking a large number of terminal pieces 90 from a metal plate. In addition, the external connection terminals 80U, 80V, and 80W each having the first plate portion 80P, which is a part to be inserted into a socket of an external device, and the second plate portion 80Q, which is connected to the first plate portion 80P at the bending line L, may be efficiently manufactured. Thus, the external connection terminals 80U, 80V, and 80W having a three-dimensional shape may be manufactured while securing a high yield of the external connection terminals 80U, 80V, and 80W.

According to the present example embodiment, the first plate portion 80P extends from one surface side to the other surface side of the second plate portion 80Q when viewed in the axial direction. Thereby, the first plate portion 80P may be widened while securing a high yield of the external connection terminals 80U, 80V, and 80W.

According to the present example embodiment, the first connection portion 85A connected to the first layer bus bars 71U, 71V, and 71W is located on one surface side of the first plate portion 80P, and the second connection portion 85B connected to the second layer bus bars 72U, 72V, and 72W is located on the other surface side of the first plate portion 80P.

Thereby, even when the external connection terminals 80U, 80V, and 80W have a plurality of first connection portions 85A and a plurality of second connection portions 85B, a high yield of the external connection terminals 80U, 80V, and 80W may be secured. Further, the workability of the connection process may be improved by sufficiently separating the distance between the first connection portion 85A and the second connection portion 85B.

According to the present example embodiment, the positions of the first layer bus bars 71U, 71V, and 71W in the axial direction are different from the positions of the second layer bus bars 72U, 72V, and 72W in the axial direction. Further, the first connection portion 85A is inserted into each of the terminal insertion holes 73h formed in the first layer bus bars 71U, 71V, and 71W. The second connection portion 85B is inserted into each of the terminal insertion holes 74h formed in the second layer bus bars 72U, 72V, and 72W. That is, the axial positions of the connection positions between the external connection terminals 80U, 80V, and 80W and the first layer bus bar 71, and the axial positions of the connection positions between the external connection terminals 80U, 80V, and 80W and the second layer bus bar 72 are different from each other.

In this manner, the first connection portion 85A and the second connection portion 85B protruding downward are inserted into the terminal insertion holes 73h and 74h, respectively. The dimensional accuracy of the first connection portion 85A and the second connection portion 85B may be suppressed in comparison with the case in which the first connection portion 85A and the second connection portion 85B are butted against and joined to the first layer bus bars 71U, 71V, and 71W and the second layer bus bars 72U, 72V, and 72W.

According to the present example embodiment, the motor includes the above-described bus bar unit 60. Thus, the external connection terminals 80U, 80V, and 80W having a three-dimensional shape may be easily manufactured while securing a high yield of the external connection terminals 80U, 80V, and 80W.

Figure 13:
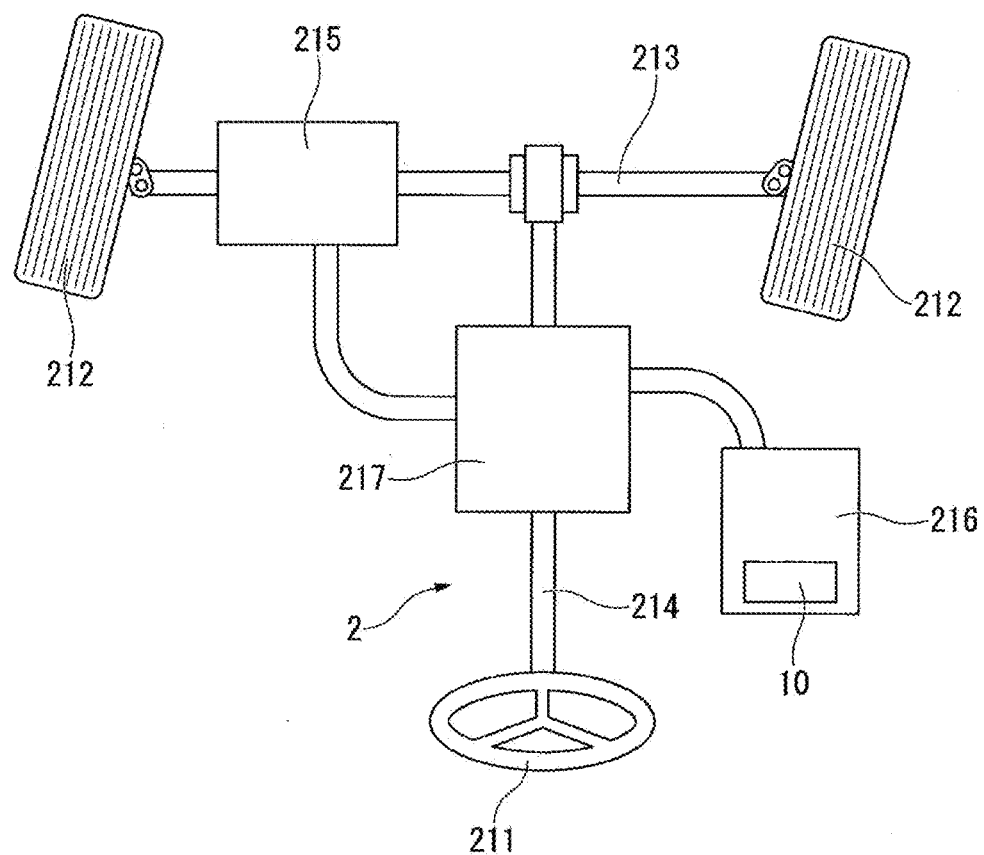
FIG. 13 is a view illustrating an apparatus to which a motor of an example embodiment of the present disclosure is mounted.

FIG. 13 is a view illustrating an apparatus to which the motor of the example embodiment is mounted.

Next, an example embodiment of an apparatus to which the motor 10 of the present example embodiment is mounted will be described. In the present example embodiment, an example in which the motor 10 is mounted on an electric power steering apparatus will be described. An electric power steering apparatus 2 shown in FIG. 13 is mounted on a steering mechanism of a wheel of an automobile. The electric power steering apparatus 2 is an apparatus configured to reduce steering force by hydraulic pressure. The electric power steering apparatus 2 includes the motor 10, a steering shaft 214, an oil pump 216, and a control valve 217.

The steering shaft 214 transmits an input from the steering 211 to an axle 213 having wheels 212. The oil pump 216 generates hydraulic pressure in a power cylinder 215 that transmits a driving force by the hydraulic pressure to the axle 213. The control valve 217 controls oil of the oil pump 216. In the electric power steering apparatus 2, the motor 10 is mounted as a driving source of the oil pump 216.

The electric power steering apparatus 2 of the present example embodiment includes the motor 10 of the present example embodiment, and thus the bus bar unit 60 may be miniaturized, and the influence of a magnetic field on the outside may be suppressed.

Although the example embodiment of the present disclosure has been described above, each configuration and combination thereof in the example embodiment are an example, and addition, omission, replacement, and other modifications of the configuration are possible without departing from the spirit of the present disclosure. Further, the present disclosure is not limited by the example embodiment.

For example, the motor of the example embodiment described above is not limited to being mounted on an electric power steering apparatus, and may be mounted on any apparatus.

Further, in the example embodiment, each portion of the first layer bus bars 71U, 71V, and 71W and each portion of the second layer bus bars 72U, 72V, and 72W are stretched in a linear shape, but may be stretched while curving the same.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A bus bar unit that is provided in a motor, the bus bar unit comprising:
    a bus bar holder provided on one side in an axial direction of a stator disposed in an annular shape around a central axis extending in a vertical direction;
    a bus bar extending in a direction perpendicular to the axial direction and fixed to the bus bar holder; and
    an external connection terminal connected to the bus bar and extending to one side in the axial direction from the bus bar; wherein
    the external connection terminal has a plate shape, and includes a first plate portion extending toward one side in the axial direction, and a second plate portion that is positioned on a base end side of the first plate portion, is provided with a connection portion connected to the bus bar, and faces a direction different from the first plate portion;
    the first plate portion and the second plate portion are connected to each other in a bending line extending in the axial direction; and
    the second plate portion extends from one surface side to the other surface side of the first plate portion when viewed in the axial direction.

2. The bus bar unit of claim 1, wherein the first plate portion extends from one surface side to the other surface side of the second plate portion when viewed in the axial direction.

3. The bus bar unit of claim 1, wherein
    the bus bar unit includes the plurality of bus bars including a first bus bar and a second bus bar;
    the second plate portion includes the plurality of connection portions including a first connection portion connected to the first bus bar and a second connection portion connected to the second bus bar; and
    the first connection portion is located on one surface side of the first plate portion, and the second connection portion is located on the other surface side of the first plate portion, when viewed in the axial direction.

4. The bus bar unit of claim 3, wherein
    axial positions of the first bus bar and the second bus bar are different from each other;
    the first connection portion is a first convex portion protruding downwardly and is inserted into a first through hole provided in the first bus bar; and
    the second connection portion is a second convex portion protruding downwardly and is inserted into a second through hole provided in the second bus bar.

5. The bus bar unit of claim 1, wherein the first plate portion includes a pair of protrusions protruding to both sides in a width direction.

6. The bus bar unit of claim 5, wherein the bus bar holder includes a terminal holding portion to hold the pair of protrusions.

7. The bus bar unit of claim 6, wherein
    the terminal holding portion includes a pair of holding grooves extending along the axial direction; and
    the protrusion is inserted into the holding groove.

8. A motor comprising:
    the bus bar unit of claim 1;
    the stator around which a coil wire is wound; and
    a rotor facing the stator in the radial direction through a gap.

* * * * *